US011328277B2

(12) United States Patent
Gonzales et al.

(10) Patent No.: US 11,328,277 B2
(45) Date of Patent: May 10, 2022

(54) MERCHANT POINT OF SALE COLLABORATING WITH PAYMENT READER TERMINAL VIA SERVER APPLICATION PROGRAMMING INTERFACE

(71) Applicant: Square, Inc., San Francisco, CA (US)

(72) Inventors: Edward Gonzales, San Francisco, CA (US); Christian De Angelis, San Francisco, CA (US); Marc Perry, San Francisco, CA (US); Eric Zundel Ayers, San Francisco, CA (US); Vibhor Chhabra, San Francisco, CA (US); Adam Edwards, San Francisco, CA (US); Christopher Heisel, San Francisco, CA (US); Morgan Engel, San Francisco, CA (US); Stephen Brewer, San Francisco, CA (US); Ryder Moody, San Francisco, CA (US)

(73) Assignee: Block, Inc., San Francisco, CA (US)

( * ) Notice: Subject to any disclaimer, the term of this patent is extended or adjusted under 35 U.S.C. 154(b) by 0 days.

(21) Appl. No.: 16/533,095

(22) Filed: Aug. 6, 2019

(65) Prior Publication Data
US 2021/0073763 A1  Mar. 11, 2021

(51) Int. Cl.
*G06Q 20/20* (2012.01)
(52) U.S. Cl.
CPC ......... *G06Q 20/201* (2013.01); *G06Q 20/208* (2013.01)
(58) Field of Classification Search
CPC .......................... G06Q 20/201; G06Q 20/208
See application file for complete search history.

(56) References Cited

U.S. PATENT DOCUMENTS

| 7,971,782 | B1 | 7/2011 | Shams |
| 9,312,949 | B1 | 4/2016 | Templeton et al. |
| 9,390,412 | B2 * | 7/2016 | Weber ................ G06Q 20/3823 |
| 10,037,516 | B2 | 7/2018 | Mardikar et al. |
| 10,242,357 | B1 | 3/2019 | Dorogusker et al. |

(Continued)

FOREIGN PATENT DOCUMENTS

| EP | 2680243 | 1/2014 |
| WO | 2021/026268 A1 | 2/2021 |

OTHER PUBLICATIONS

Non-Final Office Action dated Oct. 27, 2020, in U.S. Appl. No. 16/533,098, Gonzales, E., et al., filed Aug. 6, 2019.

(Continued)

*Primary Examiner* — Bruce I Ebersman
*Assistant Examiner* — Matthew Cobb
(74) *Attorney, Agent, or Firm* — Polsinelli PC

(57) ABSTRACT

A merchant uses a merchant point of sale (POS) device to identify items or services for purchase by a customer, and costs for each. One or more payment amounts are sent from the merchant POS device to a checkout server using an application programming interface (API), which the checkout server sends on to an authorized payment terminal device that then reads payment information from a payment object and sends the payment information back to the checkout server. The checkout server processes the transaction and confirms transaction completion to the merchant POS device and payment terminal device.

22 Claims, 7 Drawing Sheets

(56) References Cited

U.S. PATENT DOCUMENTS

| | | | |
|---|---|---|---|
| 10,438,176 B2 | 10/2019 | Johnson et al. | |
| 10,445,716 B1 | 10/2019 | Riechers et al. | |
| 10,755,281 B1 | 8/2020 | Yip et al. | |
| 10,783,508 B1 | 9/2020 | Bell et al. | |
| 2004/0054592 A1* | 3/2004 | Hernblad | G06Q 50/12 705/15 |
| 2012/0066081 A1* | 3/2012 | Shader | G06Q 20/206 705/18 |
| 2012/0130895 A1* | 5/2012 | Granbery | G06Q 20/327 705/44 |
| 2012/0253852 A1* | 10/2012 | Pourfallah | G06Q 20/405 705/4 |
| 2013/0238456 A1* | 9/2013 | Soysa | G06Q 20/20 705/21 |
| 2014/0279106 A1* | 9/2014 | Smelcer | G06Q 20/047 705/21 |
| 2014/0279525 A1 | 9/2014 | Mohsenzadeh | |
| 2015/0058145 A1 | 2/2015 | Luciani | |
| 2015/0178708 A1* | 6/2015 | Reutov | G06Q 20/027 705/44 |
| 2016/0005132 A1* | 1/2016 | Freeman | G06Q 20/32 705/30 |
| 2016/0162882 A1* | 6/2016 | McClung, III | G06Q 20/3227 705/41 |
| 2016/0247141 A1 | 8/2016 | Graylin et al. | |
| 2017/0004475 A1 | 1/2017 | White et al. | |
| 2017/0076269 A1* | 3/2017 | Saeed | G07G 1/0018 |
| 2017/0091762 A1 | 3/2017 | Rezayee et al. | |
| 2018/0268395 A1* | 9/2018 | Donk | G06Q 20/325 |
| 2019/0019174 A1 | 1/2019 | Mohsenzadeh | |
| 2020/0210977 A1 | 7/2020 | Jagalpure et al. | |
| 2021/0073766 A1* | 3/2021 | Gonzales | G06Q 20/12 |

OTHER PUBLICATIONS

International Search Report and Written Opinion issued by the International Searching Authority dated Oct. 19, 2020, 12 pages, for the corresponding International Patent Application PCT/US2020/045060.

Anonymous, "Application programming interface key," Wikipedia, May 13, 2018, available at https://en.wikipedia.org/w/index.php?title=Application_programming_interface_key&oldid=840999011, retrieved Oct. 13, 2021.

Non-final Office Action dated Apr. 6, 2021, in U.S. Appl. No. 15/533,098, Gonzales, E., et al., filed Aug. 6, 2019.

Notice of Allowance dated Aug. 30, 2021, in U.S. Appl. No. 15/533,098, Gonzales, E., et al., filed Aug. 6, 2019.

* cited by examiner

MERCHANT POINT OF SALE COLLABORATING WITH PAYMENT READER TERMINAL VIA SERVER APPLICATION PROGRAMMING INTERFACE

BACKGROUND

Payment cards, such as credit cards and debit cards, are often used by customers during transactions with merchants. Merchants can read payment information from payment cards using payment card reader terminals, for example via magnetic stripe readers or Europay/Mastercard/Visa (EMV) chip readers in the payment card reader terminals. Payment card reader terminals read payment card information from the payment card and send that payment card information to a server associated with a financial entity, such as a bank or credit card institution, in order to process the transaction by transferring funds from a customer account to a merchant account.

Merchant point of sale (POS) devices are systems that are used by merchants to enter items or services requested by a customer, retrieve prices for each item or service, calculate a total, and in some cases prepare a receipt or invoice to be printed and given to the customer before or after payment processing. Merchant POS systems can be customized for different industries. For example, some merchant POS systems are connected to bar code scanners that can scan bar codes attached to various items sold at the stores, so that items selected for purchase by the customer can quickly be identified to the merchant POS device.

A merchant POS and a payment terminal may sometimes be co-located in a single device. In some cases, however, a merchant may need to use a particular merchant POS device that is specially designed for the merchant's needs. A merchant may also wish to offload receipt of customer personal data to a separate payment terminal device to reduce the risk of loss of that customer personal data in a data breach. The benefits of using separate a merchant POS device and a separate payment card reader terminal thus include granting the merchant freedom to customize their merchant POS device without compromising payment security and functionality.

There is a need for a system that enables intuitive, efficient, and secure pairing and collaboration between a merchant POS device and a payment card reader terminal.

DETAILED DESCRIPTION

A merchant uses a merchant point of sale (POS) device to identify items or services for purchase by a customer, and costs for each. One or more payment amounts are sent from the merchant POS device to a checkout server using an application programming interface (API), which the checkout server sends on to an authorized payment terminal device that then reads payment information from a payment object and sends the payment information back to the checkout server. The checkout server processes the transaction and confirms transaction completion to the merchant POS device and payment terminal device.

Figure 1:
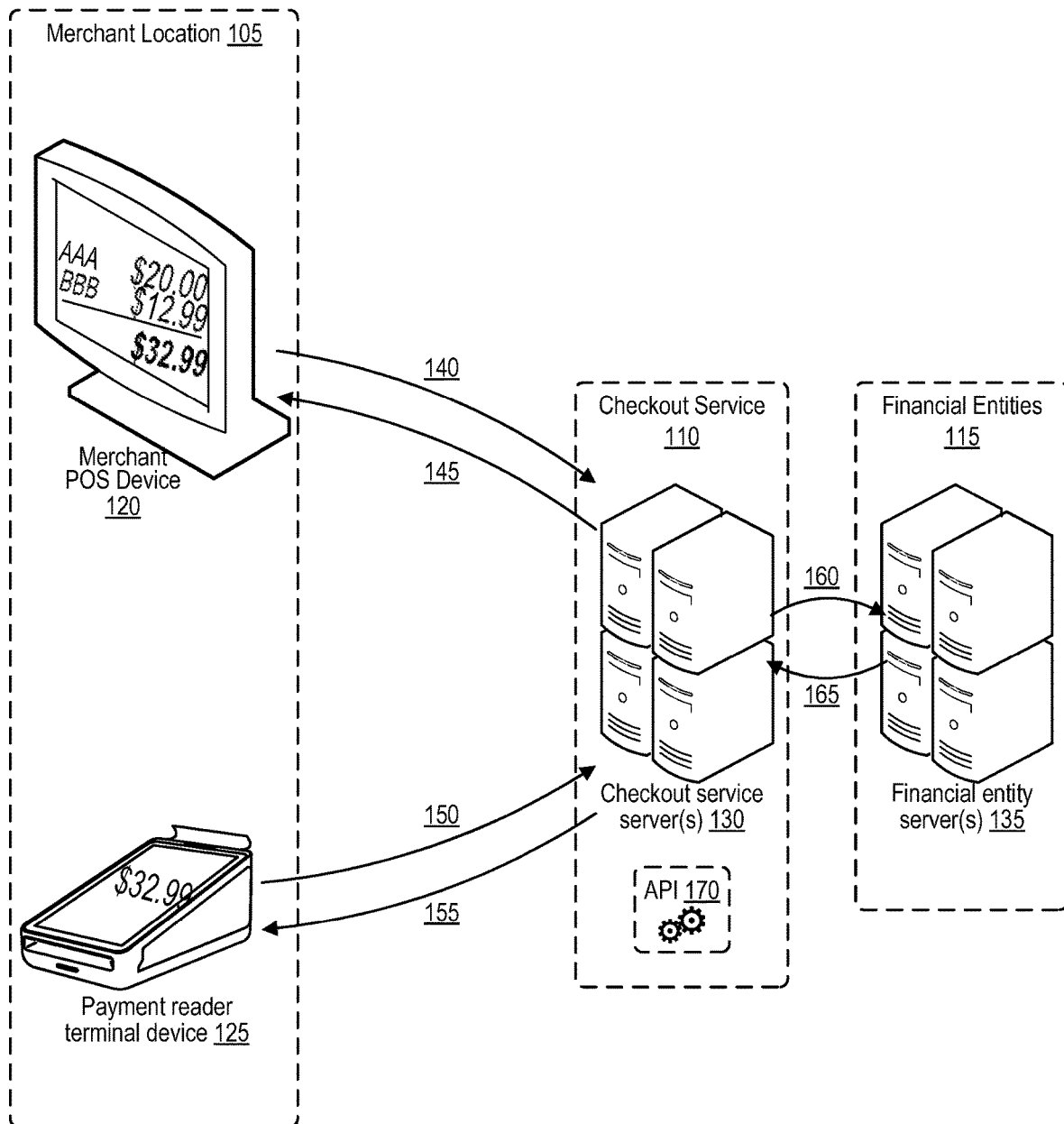
FIG. 1 illustrates a system architecture including a merchant point of sale (POS) device, a payment reader terminal, a checkout service server, and a financial entity server.

FIG. 1 illustrates a system architecture including a merchant point of sale (POS) device, a payment reader terminal, a checkout service server, and a financial entity server.

Payment instruments, also referred to as payment objects, transaction instruments, or transaction objects, may include payment cards or transaction cards such as credit cards, debit cards, gift cards, or transit cards. Payment instruments may also include payment devices or transaction devices, such as cellular phones, wearable devices, smartphones, tablet devices, laptops, media players, portable gaming consoles, and other computing devices 700 as discussed with respect to FIG. 7. Payment instruments may store payment instrument information (which may be referred to as payment object information, payment card information, payment device information, payment information, transaction object information, transaction card information, transaction device information, or transaction information), for example encoded along a magnetic stripe on the payment instrument, stored on an integrated circuit (IC) chip such as a Europay/Mastercard/Visa (EMV) chip, or stored in a non-transitory computer-readable storage medium electrically coupled to one or more active and/or passive near field communication (NFC) transceivers of the payment instrument.

The payment reader terminal device 125 of FIG. 1 includes hardware for reading payment instrument information from a one or more types of payment instrument. In particular, the payment reader terminal device 125 of FIG. 1 is illustrated with a slot on the right-hand side with a magnetic stripe reader. A payment card can be swiped through the slot, allowing the magnetic stripe reader of the payment reader terminal device 125 to read the payment instrument information from a magnetic stripe of the payment card. The payment reader terminal device 125 of FIG. 1 is also illustrated with a slot at the anterior end with an integrated circuit (IC) chip reader, such as aEuropay/Mastercard/Visa (EMV) chip reader. One end of a payment card can be inserted into the slot, allowing the IC chip reader to read the payment instrument information from an IC chip of the payment card, which may be an EMV chip of the payment card. The payment reader terminal device 125 of FIG. 1 also includes one or more active and/or passive near field communication (NFC) transceivers. A NFC-capable payment instrument can be placed adjacent to the one or more NFC transceivers of the payment reader terminal device 125, allowing the one or more active and/or passive NFC transceivers of the payment card terminal to read the payment instrument information from one or more active and/or passive NFC transceivers of the payment instrument. NFC-capable payment cards may include passive NFC transceivers, but may in some cases instead or additionally include active NFC transceivers. NFC-capable payment devices may include active NFC transceivers, but may in some cases instead or additionally include passive NFC transceivers.

Figure 7:
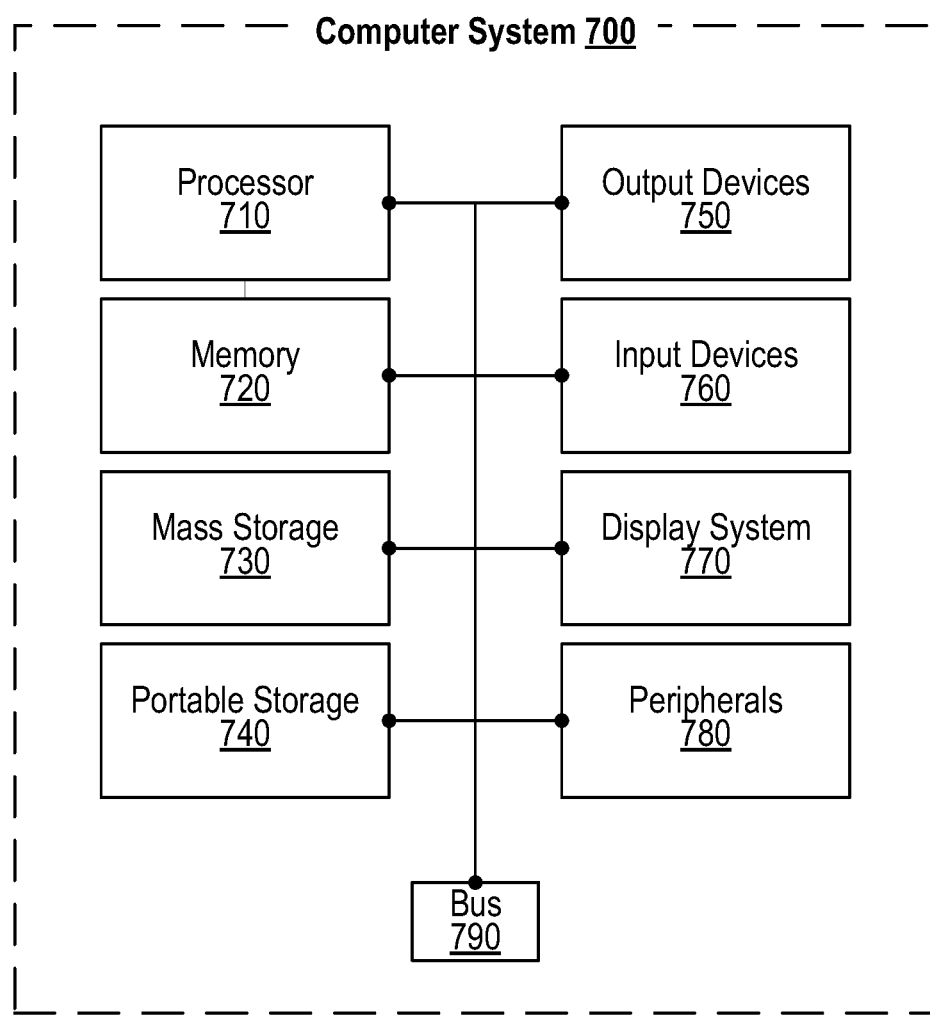
FIG. 7 is a block diagram of an exemplary computing device that may be used to implement some aspects of the technology.

The payment reader terminal device 125 of FIG. 1 also includes a display screen, which may include any type of display system 770 illustrated in and discussed with respect to FIG. 7. The payment reader terminal device 125 may render various messages or interfaces that for display on the display screen, such as messages with payment instructions instructing customers or merchants to swipe a payment card through a magnetic stripe reader slot of the payment reader terminal device 125, insert a payment card into an IC reader slot of the payment reader terminal device 125, or tap a NFC-capable payment instrument adjacent to one or more NFC transceivers of the payment reader terminal device 125. The payment reader terminal device 125 may in some cases render a keypad or keyboard for display on the display screen, so that the customer may enter a personal identification number (PIN), a password, a phone number, a member number, an email address, a signature, or some other customer identifier code via a touch-sensitive interface of the display screen. As discussed with respect to FIG. 4, the display screen may also receive additional messages from the checkout service 110, which may for example include merchant advertisements or offers for additional items or services to purchase from the merchant, or coupons or discounts that may be applied, and which may be rendered by the payment reader terminal device 125 and displayed by its display screen until the payment reader terminal device 125 receives an order for a transaction to process, which may simply include a payment amount to charge the customer as discussed with respect to FIG. 2.

A merchant point of sale (POS) device 120 is also illustrated in FIG. 1. The merchant POS device 120 is a system that is used by a merchant to identify one or more purchases from the merchant by a customer (i.e., one or more items or services requested for purchase from the merchant by a customer), retrieve prices for each identified item or service, calculate a total, and in some cases prepare a receipt or invoice to be printed and given to the customer before or after payment processing. In some cases, the items or services may be identified by selecting an icon or text box corresponding to the item or service via an input device of the merchant point of sale (POS) device 120, such as a touch-sensitive surface of a touchscreen, a keypad, a keyboard, a mouse or trackpad controlling a mouse cursor, any other input device. In some cases, the items or services may be identified using a bar code scanner in communication with the merchant POS device 120, the merchant using the bar code scanner to scan bar codes affixed to the items, packaging associated with the items, tickets or vouchers associated with the services, or some combination thereof. In some cases, an amount or quantity of one or more of the items may be determined based on weight as determined by a scale in communication with the merchant POS device 120, the merchant using the scale to weigh the items (e.g., fruits, vegetables, grains, meats, or other consumables). In some cases, the merchant POS device 120 may handle appointments or reservations for services such as restaurant meals or doctor's appointments. The hardware and/or software of merchant POS devices 120 and used with merchant POS devices 120 may be customized differently for different industries. The merchant POS device 120 of FIG. 1 is illustrated as a touchscreen device showing an item or service identified "AAA" costing $20.00 as a first purchase and an item or service identified "BBB" costing $12.99 as a second purchase, the first purchase and second purchase summed up by the merchant POS devices 120 to a total payment amount of $32.99.

The merchant POS device 120 and the payment reader terminal device 125 of FIG. 1 are both located at a merchant location 105, but are not directly connected to one another through any wired means nor through any wireless means, though in some cases they may be connected to the same Wi-Fi network, other WLAN network, or cellular phone network. Instead, the merchant POS device 120 and payment reader terminal device 125 are both connected through network connections to one or more checkout service servers 130 of the checkout service 110. In particular, the network connection(s) between the merchant POS device 120 and the one or more checkout service servers 130 are illustrated via arrow lines 140 and 145 in FIG. 1, while the network connection(s) between the payment reader terminal device 125 and the one or more checkout service servers 130 are illustrated via arrow lines 150 and 155 in FIG. 1. The one or more checkout service servers 130 may connect via network connection(s) to one or more financial entity servers 135 associated with one or more financial entities 115, which may be banks, credit card institutions, or other financial institutions, the network connection(s) illustrated via arrow lines 160 and 165 in FIG. 1. In some cases, the merchant POS device 120 and payment reader terminal device 125 may be connected in a wired or wireless manner, but not for the transfer of payment data or data related to the transaction (e.g., instead to share a power supply or to transfer other non-sensitive information).

The checkout service 110 may include an application programming interface (API) 170 through which the merchant POS device 120 and/or the payment reader terminal device 125 may communicate with the one or more checkout service servers 130. That is, the one or more checkout service servers 130 store include instructions that, when executed by one or more processors of the one or more checkout service servers 130, allow or cause the processors to interpret information sent to the one or more checkout service servers 130 from the merchant POS device 120 and/or the payment reader terminal device 125 when the information is generated by calling or invoking one or more functions of the API that in some cases format the information according to a format dictated by the API. Execution of the instructions by the one or more processors of the one or more checkout service servers 130 may further allow or cause the processors to format information according to the format dictated by the API before sending the information from the one or more checkout service servers 130 to the merchant POS device 120 and/or the payment reader terminal device 125. The information (in either direction) may include, for example, GET or HEAD actions requesting data, PUT or POST or PATCH actions creating and/or updating and/or overwriting and/or modifying and/or sending data, DELETE actions deleting data, CONNECT actions establishing connections between two or more devices, OPTIONS actions requesting data about available communication options, TRACE actions requesting a response, other HTTP methods, or some combination thereof. In some cases, the information (in either direction) may include, for example, payment requests, requests for further information, database queries, database query results, instructions or commands, payment instrument information, a payment amount update or modification, a transaction update or modification, a transaction cancellation, a merchant POS device identifier, a payment reader terminal device identifier, another device identifier, other messages or types of information, or some combination thereof. In some cases, the API may be a Representation State Transfer (RESTful) API. In some cases, the format dictated by the API may be that of an HTTP request or a HTTP response.

One example of the communications 140, 145, 150, 155, 160, and 165 is given below. In this example, the arrow line 140 represents the merchant POS device 120 sending a payment amount and a merchant POS device identifier (ID) to the checkout service 110 (i.e., to the one or more checkout service servers 130), optionally by calling the API 170 from the merchant POS device 120. The arrow line 150 represents the payment reader terminal device 125 sending a payment terminal device identifier (ID) to the checkout service 110, optionally by calling the API 170 from the payment reader terminal device 125. The arrow line 150 may also represent the payment reader terminal device 125 querying or polling the checkout service 110 as to the existence of any transactions or orders pending processing. The arrow line 155 may represent the checkout service 110 sending the payment amount to the payment reader terminal device 125, optionally along with a request to the payment reader terminal device 125 to initiate reading of payment instrument information, optionally calling the API 170 from the checkout service 110. The arrow line 150 may then represent the payment reader terminal device 125 sending the payment instrument information (optionally encrypted at the payment reader terminal device 125) to the checkout service 110 after the payment reader terminal device 125 reads the payment instrument, optionally by calling the API 170 from the payment reader terminal device 125.

The arrow line 160 represents the checkout service 110 sending at least the payment instrument information and the payment amount (and optionally information identifying the customer, an account associated with the customer, the merchant, an account associated with the merchant, or a unique identifier associated with any of these) to the one or more financial entity servers 135 associated with the one or more financial entities 115. Based on the information that the financial entity servers 135 receive from arrow 160, the one or more financial entity servers 135 associated with the financial entities 115 identify an account associated with the customer, such as the customer's personal bank account, an account of an organization that the customer belongs to, or a credit account associated with the customer's credit card or a credit card of an organization that the customer belongs to. The one or more financial entity servers 135 associated with the financial entities 115 identify an account associated with the merchant, and process a transfer of funds in an amount equivalent to at least the payment amount (optionally also including one or more added tips, taxes, and/or fees) from the identified account associated with the customer to the identified account associated with the merchant. The arrow line 165 represents the one or more financial entity servers 135 associated with the financial entities 115 confirming to the checkout service 110 whether the transfer was successful, meaning the transaction was successfully processed, or unsuccessful, meaning the transaction processing was unsuccessful.

The arrow line 145 represents the checkout service 110 confirming whether the transaction was successfully processed to the merchant POS device 120, optionally via the API 170. The arrow line 155 represents the checkout service 110 confirming whether the transaction was successfully processed to the payment reader terminal device 125, optionally via the API 170. Upon receiving the confirmations, the merchant POS device 120 and/or payment reader terminal device 125 may return to "default" or "end of transaction" or "next transaction" screens or interfaces in which they are ready for a next transaction. In some cases, the arrow line 145 or 155 may also include receipt data generated at the checkout service 110 and used by the merchant POS device 120 and/or the payment reader terminal device 125 to print a paper receipt using a printer of the merchant POS device 120 and/or the payment reader terminal device 125. The receipt may alternately or additionally be sent by the checkout service 110 (and/or by the merchant POS device 120 and/or by the payment reader terminal device 125) to a phone number (via text message), email address, or messaging platform username associated with the customer.

In some cases, the checkout service 110 and/or payment reader terminal device 125 may perform a cardless transaction. That is, the merchant POS device 120 may receive a customer identifier from the customer, for example as entered by the merchant or the customer via a user interface of the merchant POS device 120. The customer identifier (customer ID) may be, for example, the customer's name, phone number, email address, mailing address, bank account number, credit account number, driver's license number, government-issued identification number, username, personal identification number (PIN), a unique code, some other identifier establishing the customer's identity, or some combination thereof. The merchant POS device 120 may send the customer identifier, and optionally also a merchant identifier (merchant ID) similarly establishing the identity of the merchant, to the checkout service 110 along arrow line 140 along with the payment amount. The checkout service 110 may then query a database for the customer identifier to locate an account at the checkout service associated with the customer, query the database for the merchant identifier to locate an account at the checkout service associated with the merchant, and perform a transfer of at least the payment amount from the account associated with the customer to the account associated with the merchant. In some cases, the customer identifier and/or the merchant identifier are sent by the checkout service 110 to the payment reader terminal device 125 or to the one or more financial entity servers 135, so that the database queries and transfer of at least the payment amount from the account associated with the customer to the account associated with the merchant can occur at the payment reader terminal device 125, the one or more checkout service servers 130, the one or more financial entity servers 135, or some combination thereof. Confirmations upon completion of the transfer may then be sent to the payment reader terminal device 125 and/or to the merchant POS device 120 by the checkout service 110.

A merchant POS and a payment terminal may sometimes be co-located in a single device. In some cases, however, a merchant may need to use a particular merchant POS device that is specially designed for the merchant's needs, for example to connect to a particular inventory management system, or to connect to specialized hardware such as a bar code scanner or a scale to measure weight of items being purchased. A merchant may also wish to offload receipt of customer personal data to a separate payment terminal device to reduce the risk of loss of that customer personal data in a data breach. The benefits of using separate a merchant POS device and a separate payment card reader terminal thus include granting the merchant freedom to customize their merchant POS device without compromising payment security and functionality.

The merchant POS device 120, the payment reader terminal device 125, the one or more checkout service servers 130, and the one or more financial entity servers 135 may each include one or more computing devices 700, or may include at least a subset of the components of the computing device 700 that are illustrated in and/or discussed with respect to FIG. 7.

In some cases, the merchant POS device 120 may be identified herein as the merchant device or the POS device. In some cases, the payment reader terminal device may be referred to herein as the payment reader, the payment card reader, the payment instrument reader, the payment object reader, the payment reader terminal, the payment card reader terminal, the payment instrument reader terminal, the payment object reader terminal, the payment terminal, the payment terminal device, the terminal device, the payment object reader device, the payment reader device, the payment card reader device, the payment instrument reader device, the payment object reader device, any of the terms identified above with the word "payment" substituted with the word "transaction," or some combination thereof. In some cases, the one or more checkout service servers 130 may be referred to collectively herein as the checkout service 110. In some cases, the one or more financial entity service servers 130 may be referred to collectively herein as the one or more financial entities 115 or as the one or more payment processing services.

Figure 2:
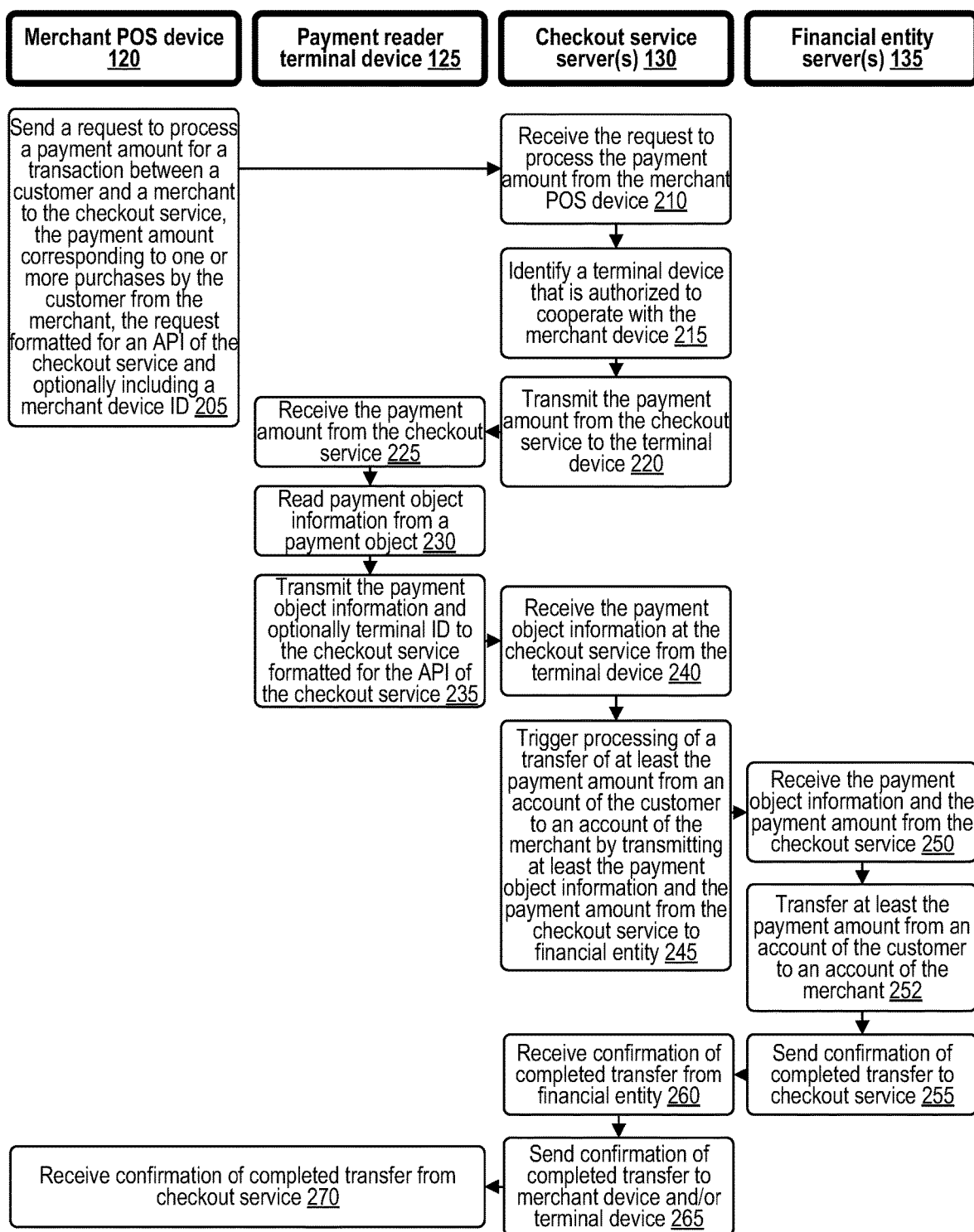
FIG. 2 is a swim lane diagram illustrating a merchant point of sale (POS) device, a payment reader terminal, and a checkout service cooperating to process a transaction between a customer and a merchant.

FIG. 2 is a swim lane diagram illustrating a merchant point of sale (POS) device, a payment reader terminal, and a checkout service cooperating to process a transaction between a customer and a merchant. In particular, the operations 200 of FIG. 2 are illustrated as being performed by the merchant POS device 120, the payment reader terminal device 125, the checkout service server(s) 130, the financial entity server(s) 135, or some combination thereof.

At step 205, the merchant POS device 120 sends a request to process a payment amount for a transaction between a customer and a merchant to the checkout service, the payment amount corresponding to one or more purchases by the customer from the merchant, the request formatted for an API 170 of the checkout service 110 and optionally including a merchant POS device identifier (merchant POS device ID). At step 210, the checkout service server(s) 130 receive the request to process the payment amount from the merchant POS device 120, and optionally receive the merchant identifier. In some cases, the merchant POS device 125 may also send a customer identifier identifying the customer and/or a merchant identifier identifying the merchant to the checkout service 110, which the checkout service 110 may receive and optionally use to identify the customer and/or the merchant, and/or send on to the one or more financial entity servers 135 (e.g., at step 245) so that the financial entity servers 135 can use the customer identifier and/or merchant identifiers to identify the customer and/or the merchant.

At step 215, the checkout service server(s) 130 identify a payment reader terminal device 125 that is authorized to cooperate with the merchant POS device 120. In some cases, the checkout service server(s) 130 performs this by querying a database using the merchant POS identifier sent by the merchant POS device 120 at step 205 and received at the checkout service 110 at step 210, and retrieving a record from the database as an output of the query. The record from the database may identify the merchant POS identifier as well as one or more payment reader terminal device identifiers that identify one or more payment reader terminal devices that are authorized to cooperate with the merchant POS device 120 identified by the merchant POS identifier. The payment reader terminal device identifier that identifies the payment reader terminal device 125 discussed in FIG. 2 in particular is identified as authorized to cooperate with the merchant POS device 125 based on the payment reader terminal device identifier being one of the one or more payment reader terminal device identifiers in the record. The record may be generated during step 350 of a pairing process 300 discussed in FIG. 3.

At step 220, the checkout service server(s) 130 transmit the payment amount from the checkout service to the payment reader terminal device 125. At step 225, the payment reader terminal device 125 receives the payment amount from the checkout service server(s) 130.

At step 230, the payment reader terminal device 125 reads payment instrument information from a payment instrument, for example from a magnetic stripe or an IC chip of a payment card, or from a NFC transceiver of a NFC-capable payment instrument. At step 235, the payment reader terminal device 125 transmits the payment card information and optionally a payment reader terminal identifier to the checkout service 110 formatted for the API 170 of the checkout service 110. At step 240, the checkout service server(s) 130 receive the payment card information at the checkout service from the payment reader terminal device 125, optionally along with the payment reader terminal identifier.

At step 245, the checkout service server(s) 130 trigger processing of a transfer of at least the payment amount from an account of the customer to an account of the merchant by transmitting at least the payment card information and the payment amount from the checkout service to financial entity. In some cases, the checkout service server(s) 130 may add a tip, taxes, fees, and/or other additional amounts to the payment amount if they have not already been added. In other cases, the tip, taxes, fees, and/or other additional amount may have been added to the payment amount before step 245 at the merchant POS device 120 or at the payment reader terminal device 125. At step 250, the financial entity server(s) 135 receive the payment instrument information and the payment amount from the checkout service 110. At step 252, the financial entity server(s) 135 transfer at least the payment amount from an account of the customer to an account of the merchant 250.

In some cases, the payment instrument information is encrypted using an encryption key by the payment reader terminal device 125 after it is read at step 230 but before it is transmitted at step 235, and is decrypted by the financial entity server(s) 135 using a corresponding encryption key. The encryption key stored at the payment reader terminal device 125 and the corresponding encryption key stored at the financial entity server(s) 135 may be the same encryption key, for example if symmetric encryption is used. The encryption key stored at the payment reader terminal device 125 and the corresponding encryption key stored at the financial entity server(s) 135 may be different encryption keys, for example if asymmetric encryption is used. For example, if a public key infrastructure (PKI) is used, one of the keys may be a private key while the other is a public key. The payment instrument information may also be hashed and/or tokenized at the payment reader terminal device 125 and/or at the financial entity server(s) 135. Encryption algorithms that may be used may include, for example, Rivest-Shamir-Adleman (RSA) encryption, Secure Hash Algorithm (SHA), Elliptic Curve Cryptography (ECC), Diffie-Hellman, or some combination thereof.

At step 255, the financial entity server(s) 135 send a confirmation that the transfer has been completed successfully, and therefore that the transaction has been processed successfully, to the checkout service 110. At step 260, the checkout service server(s) 130 receive this confirmation that the transfer has been completed successfully, and therefore that the transaction has been processed successfully, from the financial entity server(s) 135. At step 265, the checkout service server(s) 130 send a confirmation that the transfer has been completed successfully, and therefore that the transaction has been processed successfully, to the merchant POS device 120 and/or to the payment reader terminal device 125. At step 270, the merchant POS device 120 and/or to the payment reader terminal device 125 receive the confirmation that the transfer has been completed successfully, and therefore that the transaction has been processed successfully, from the checkout service server(s) 130. Upon receiving the confirmation, the merchant POS device 120 and/or to the payment reader terminal device 125 can reset to a default mode in which the merchant POS device 120 and/or the payment reader terminal device 125 can prepare for a next transaction.

In some cases, the checkout service server(s) 130 also generate a receipt at step 260, and the confirmation(s) sent at step 265 include receipt data to be used by the merchant POS device 120 and/or the payment reader terminal device 125 for printing, displaying, or sending the receipt. For example, the merchant POS device 120 and/or the payment reader terminal device 125 may print out the receipt using a printer of the merchant POS device 120 and/or of the payment reader terminal device 125. The merchant POS device 120 and/or the payment reader terminal device 125 may request input of a phone number or email address or messenger platform username of the customer (unless the phone number or email address or messenger platform username has already been received by the merchant POS device 120 and/or the payment reader terminal device 125) and may send the receipt to the customer over text message or email or messenger platform. The merchant POS device 120 and/or the payment reader terminal device 125 may send the phone number or email address or messenger platform username to the checkout service 110 (if it has not sent this information already, or if the checkout service 110 does not have this information already such as from a previous transaction) so that the checkout service 110 may send the receipt to the user over text message or email or messenger platform.

In some cases, the checkout service server(s) 130 may generate an "order" data structure based on the payment amount upon receipt of the request at step 210. The order data structure may include, for example, the payment amount, the merchant identifier, and the customer identifier. In some cases, the order may include a list of the one or more purchases requested by the customer—that is, the one or more items and/or services that the customer is requesting to purchase—and optionally prices for each of these. In some cases, the total payment amount may be calculated by the service server(s) 130 rather than by the merchant POS device 120. Step 220 may in some cases include transmitting the payment amount, but it may instead include transmitting the order data structure, or at least a subset of the information stored in the order data structure. In some cases, thus, the checkout service server(s) 130 send information identifying the one or more purchases requested by the user, and/or the prices associated with each, to the payment reader terminal device 120 at step 220, and the total payment amount may be calculated by the payment reader terminal device 120 rather than by the checkout service server(s) 130 or by the merchant POS device 120. In some cases, an order may be updated or modified before the payment instrument is read, or even after the payment instrument is read but before the transaction is processed at the financial entity server(s) 135. In such cases, the merchant POS device 120 or payment reader terminal device 125 can send a request to the checkout services server(s) 130 to update the order data structure, and the checkout services server(s) 130 can notify the merchant POS device 120 and/or the payment reader terminal device 125 about the update or modification to the order if necessary, can update the order data structure, can update the total payment amount if applicable, and can perform step 220 again by sending the updated order or payment amount to the payment reader terminal device 125 for payment instrument reading and/or can perform step 245 to trigger processing of the transaction with the updated order and/or payment amount.

While the operations 200 of FIG. 2 do not illustrate entry of a PIN, a signature, selection of a tip amount, selection of a donation amount to a charity, or any such customer information entry action, it should be understood that any of these may occur at the merchant POS device 120 and/or at the payment reader terminal device 125, in some cases depending on the capabilities of each. If the payment reader terminal device 125 includes a display screen as illustrated in FIG. 1, as well as a touchscreen interface or a keypad, then these can be received at the payment reader terminal device 125, and the payment reader terminal device 125 can send a request to the checkout service 110 to update or modify the order or payment amount if appropriate, or to generate a new transaction if appropriate. If the payment reader terminal device 125 does not include a display screen or an appropriate touchscreen interface or keypad, or if the merchant chooses not to use these, then these can be received at the merchant POS device 120, and the merchant POS device 120 can send a request to the checkout service 110 to update or modify the order or payment amount if appropriate, or to generate a new transaction if appropriate. In the case of a donation to a charity, a new transaction may be requested, since the donation amount will be paid to the charity rather than to the merchant, with the new order data structure for this new transaction including information identifying the charity so that the financial entity server(s) 135 can be notified by the checkout service server(s) 130 to transfer the customer's funds to an account associated with the charity.

In some cases, the merchant POS device 120 may be a web-based POS system on a website rather than a device physically located at the merchant location 105. In this case, the merchant POS device 120 may be a web server that serves the web site, a browser device that browses the website, or some combination thereof. The payment reader terminal device 125 may, in this situation, be a device that enabled a cardless transaction, such as the customer's own mobile device. Such a situation is illustrated in and discussed further with respect to FIG. 6.

In some cases, after the operations 200 of FIG. 2 have been performed one or more times for one or more separate transaction involving one or more customers, the checkout service server(s) 130 can generate anonymized analytics based on data collected during each of the transactions, and send the anonymized analytics back to the merchant POS device 120 or to another computing device associated with the merchant. The data can be anonymized by stripping customer identifiers, such as names, phone numbers, member numbers, addresses, from the data, or by generating new customer identifiers (e.g., unique strings of alphanumeric characters) that cannot be traced to the original customer identifiers. The anonymized analytics may, for example, show a merchant peak purchasing times, show a merchant slow times in which the fewest purchases are made, or show a merchant how many of its customers are purchasing a particular item or service. In some cases, a wireless beacon or wireless network may be used to detect mobile devices of persons entering the merchant's storefront (or vicinity), in which case the anonymized analytics may show how many of the persons entering the merchant's storefront (or vicinity) become customers. In some cases, these analytics may not be anonymized, though anonymization can be valuable in that, if the merchant suffers a data breach, personal customer data, such as any of the customer identifiers discussed herein, are not disclosed.

Figure 3:
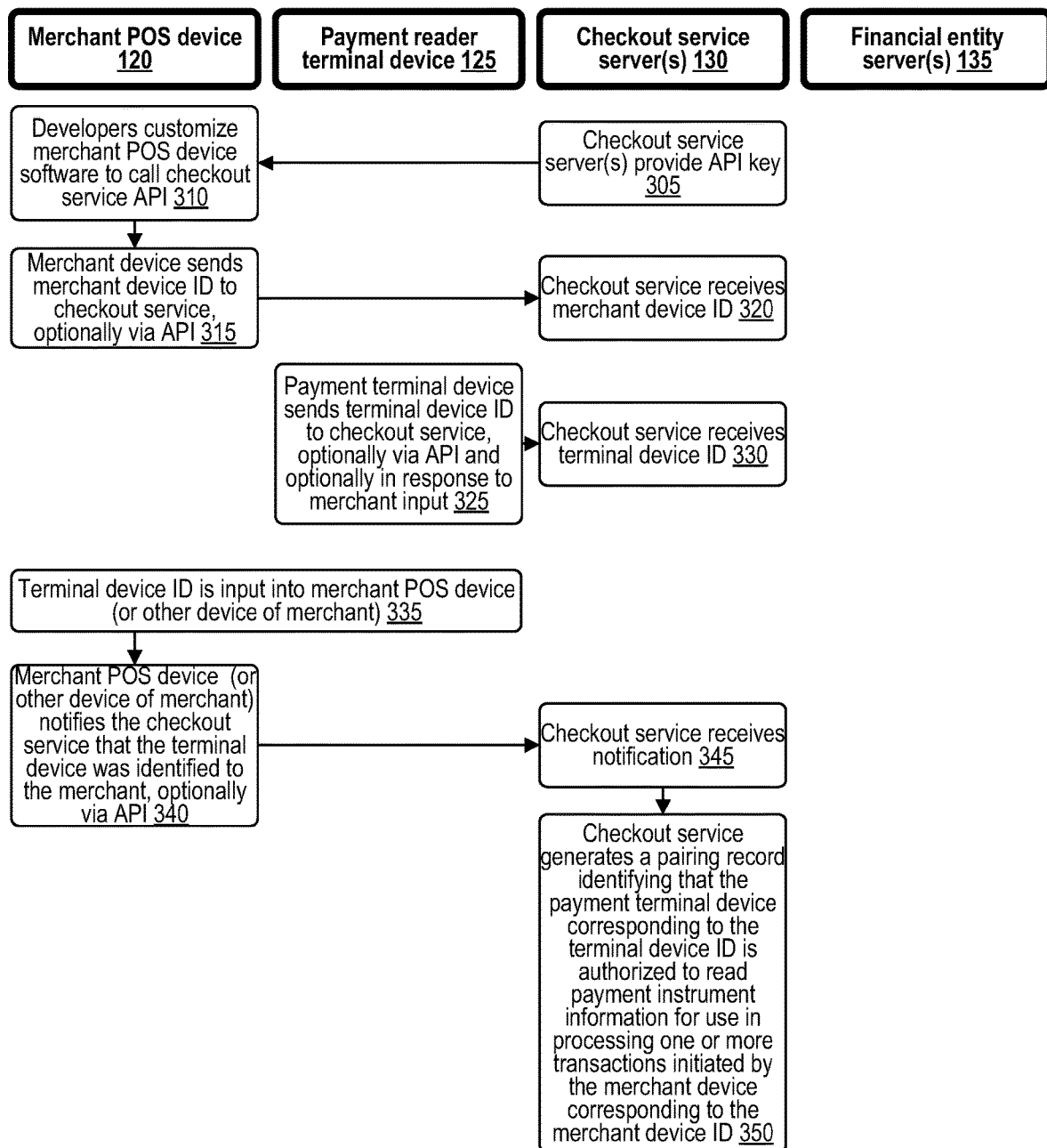
FIG. 3 is a swim lane diagram illustrating authorized pairing of a merchant point of sale (POS) device and a payment reader terminal via a checkout service.

FIG. 3 is a swim lane diagram illustrating authorized pairing of a merchant point of sale (POS) device and a payment reader terminal via a checkout service. In particular, the operations 300 of FIG. 3 are illustrated as being performed by the merchant POS device 120, the payment reader terminal device 125, the checkout service server(s) 130, the financial entity server(s) 135, or some combination thereof.

At step 305, the checkout service server(s) 130 optionally provide an API key of the API 170 of the checkout service 110 to developers of the merchant POS device 120 so that the API key can be used in the code run by the merchant POS device 120. At step 310, developers customize the software run by the merchant POS device 120 to call the API 170 of the checkout service, optionally using the API key sent at step 305.

At step 315, the merchant POS device 120 sends a merchant POS device identifier (ID) to the checkout service 110, optionally formatted for the API 170. At step 320, the checkout service server(s) 130 receive the merchant POS device identifier (ID) from the merchant POS device 120. In some cases, the merchant POS device identifier may be a serial number or model number of the merchant POS device 120, or another unique identifier of the merchant POS device 120.

At step 325, the payment reader terminal device 125 sends a payment reader terminal device identifier (ID) to the checkout service 110, optionally formatted for the API 170. At step 330, the checkout service server(s) 130 receive the merchant POS device identifier (ID) from the merchant POS device 120. In some cases, the payment reader terminal device identifier may be a serial number or model number of the payment reader terminal device 125, or another unique identifier of the payment reader terminal device 125. In some cases, step 325 is performed as a result of the payment reader terminal device 125 receiving an input via an interface (e.g., the touchscreen) of the payment reader terminal device 125, the input optionally being from the merchant, the input optionally agreeing to pair the payment reader terminal device 125 with the merchant POS device 120. In some cases, the input from the merchant is a login from the merchant or an entry of a merchant identifier of the merchant into the payment reader terminal device 125, in which case payment reader terminal device 125 may also send the merchant identifier or merchant login to the checkout service 110 along with the terminal device identifier at step 325 to simultaneously act as the notification of step 340. Steps 325 and 330 may occur before, after, or during any of steps 305, 310, 315, and/or 320. In some cases, steps 325 and 330 may not occur at all, and the payment reader terminal device identifier may be sent to the checkout service 110 for the first time at steps 340 and 345.

At step 335, the payment reader terminal device identifier is optionally input into the merchant POS device 120. In some cases, the payment reader terminal device identifier may be punched in via a keypad, keyboard, touchscreen, or other input interface. In other cases, the payment reader terminal device identifier may be scanned in to the merchant POS device 120 via scanning of a bar code or quick response (QR) code that is on the housing of the payment reader terminal device 125 or that is displayed on a display screen of the payment reader terminal device 125. At step 340, the merchant POS device 120 optionally notifies the checkout service 110 that the payment reader terminal device 125 was identified to the merchant POS device 125, optionally via the API 170. At step 345, the checkout service server(s) 130 receive the notification, optionally from the merchant POS device 120. The notification of steps 340 and 345 may optionally include the payment reader terminal device identifier as input or otherwise received by the merchant POS device 120. In some cases, a different device other than the merchant POS device 120 may perform steps 335 and 340, such as a personal user device (e.g., a smartphone) associated with the merchant, in which case it is a notification that the payment reader terminal device 125 has been identified to the merchant generally more so than to the merchant POS device 120 specifically. Use of the different device may increase flexibility by reducing how much the merchant POS device 125 must be customized at step 310, and may make pairing easier by using a device that the merchant is already familiar with.

In some cases, receipt at the checkout service 110 of the notification indicating that the terminal device has been identified to the merchant at step 345 may include receipt of a serial number (or other payment reader terminal device identifier) associated with the payment reader terminal device 125 from a device other than the payment reader terminal device 125, such as the merchant POS device 120 or mobile device of the merchant. In some cases, receipt at the checkout service 110 of the notification indicating that the terminal device has been identified to the merchant at step 345 may include receipt of a code generated by and output by the payment reader terminal device 125 (e.g., the code output via a display and/or speaker of the payment reader terminal device 125) from a device other than the payment reader terminal device 125, such as the merchant POS device 120 or mobile device of the merchant. In some cases, receipt at the checkout service 110 of the notification indicating that the terminal device has been identified to the merchant at step 345 may include receipt of a code output by a mobile device in response to the mobile device interacting with the payment reader terminal device 125 (e.g., in response to the mobile device scanning a QR code displayed by the payment reader terminal device 125) from a device other than the payment reader terminal device 125, such as the merchant POS device 120 or the mobile device. In some cases, receipt at the checkout service 110 of the notification indicating that the terminal device has been identified to the merchant at step 345 may include receipt of an indication that the payment reader terminal device 125 (or an identifier of the payment reader terminal device 125) has been selected from a list of devices (or identifiers thereof) at the merchant device. In some cases, receipt at the checkout service 110 of the notification indicating that the terminal device has been identified to the merchant at step 345 may include receipt of a notification from the merchant POS device 120 indicating that the merchant POS device 120 has received a payment reader terminal device identifier (e.g., serial number, code generated by the payment reader terminal device) associated with the payment reader terminal device 125. In some cases, receipt at the checkout service 110 of the notification indicating that the terminal device has been identified to the merchant at step 345 may include receipt of a notification from the payment reader terminal device 125 including a merchant identifier in response to receiving a merchant input at the payment reader terminal device 125 with the merchant identifier.

At step 350, in response to receipt of the notification from the merchant POS device 120 or from the different device at step 345, the checkout service server(s) 130 generates a pairing record in a database that is stored at or otherwise accessible to the checkout service server(s) 130, the pairing record identifying at least the merchant POS device identifier received in step 320 and the payment reader terminal device identifier received in step 330 (and/or in step 345). The pairing record indicates that the payment reader terminal device 125 corresponding to the payment reader terminal device identifier is authorized to collaborate with the merchant POS device 120 corresponding to the merchant POS device identifier in that the payment reader terminal device 125 is authorized to read payment instrument information for use in processing one or more transactions initiated by the merchant POS device 120. The pairing record of step 350 may be the same record discussed with respect to step 215 of the operations 200 of FIG. 2.

In some cases, more than one payment reader terminal device 125 may be paired with a particular merchant POS device 120. In this case, the merchant POS device 120 may present the merchant with a list of authorized payment reader terminal devices 125 that the merchant can use with the particular merchant POS device 120 he or she is using, from which the merchant can select one via a user interface of the merchant POS device 120. This may be useful in situations where a merchant wishes to move about different locations within their a storefront with only the merchant POS device 120, which allows the merchant to then use the nearest payment reader terminal device 125. To facilitate this use case, a map may be used instead of a list, the map optionally showing both the locations of each of the paired/authorized payment reader terminal devices 125 as well as the location of the merchant POS device 120 (and therefore of the merchant). The locations of each of these devices may be identified based on positioning receivers of the payment reader terminal devices 125 and/or of the merchant POS device 120, such as GNSS receivers, WLAN receivers, cellular network receivers, Bluetooth receivers, and the like. Bluetooth beacons may be distributed throughout the merchant location 105 (i.e., the storefront) to enhance indoor positioning, since GNSS-based typically works more accurately outdoors than indoors.

Figure 4:
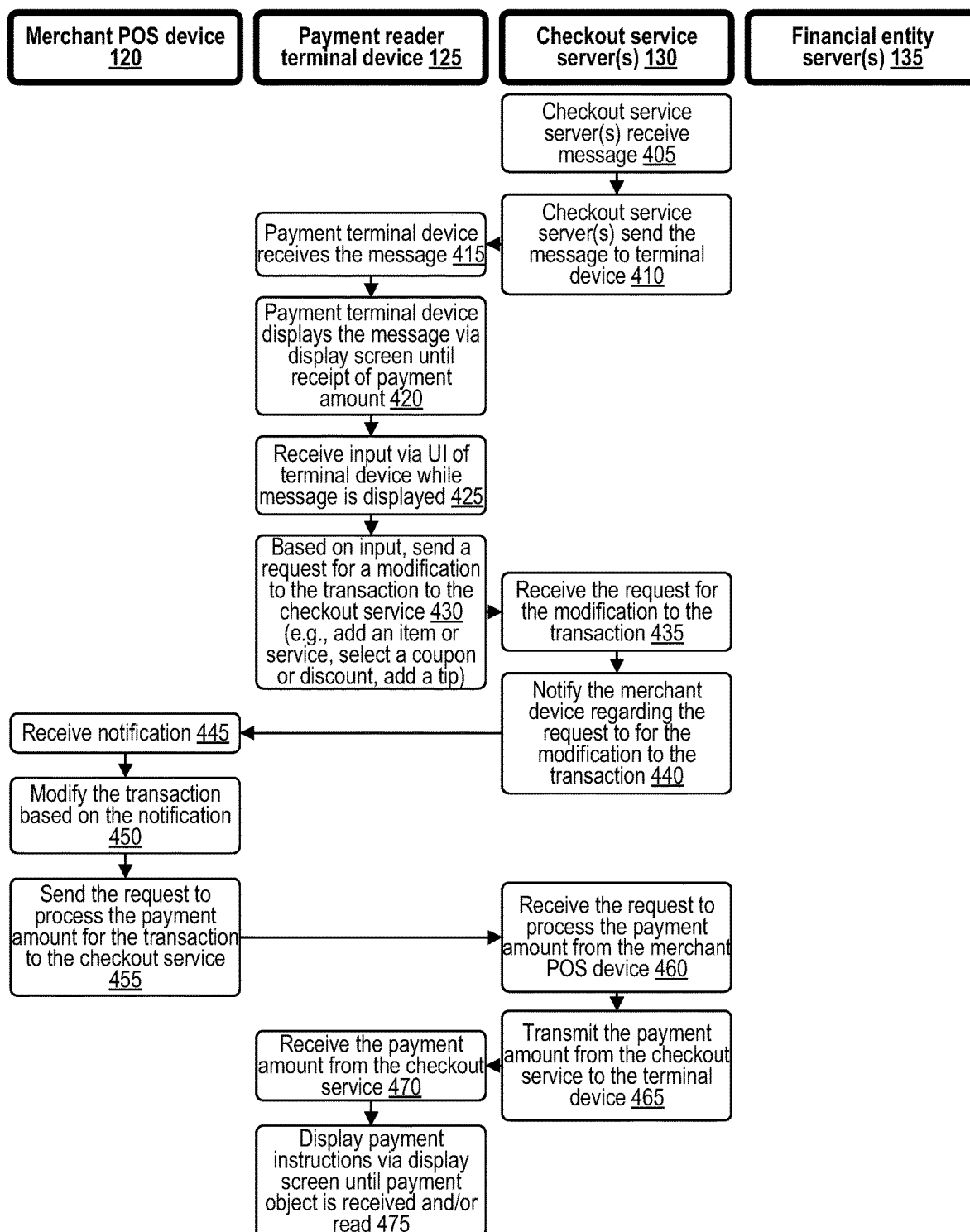
FIG. 4 is a swim lane diagram illustrating interactive customized messaging at the payment reader terminal.

FIG. 4 is a swim lane diagram illustrating interactive customized messaging at the payment reader terminal. In particular, the operations 400 of FIG. 4 are illustrated as being performed by the merchant POS device 120, the payment reader terminal device 125, the checkout service server(s) 130, the financial entity server(s) 135, or some combination thereof.

At step 405, the checkout service server(s) 130 receive a message. At step 410, the checkout service server(s) 130 send the message the payment reader terminal device 125. At step 415, the payment reader terminal device 125 receives the message from the checkout service server(s) 130. In some cases, the checkout service server(s) 130 send instructions along with the message to the payment reader terminal device 125, the instructions identifying that the payment reader terminal device 125 should display the message until it is time for the payment reader terminal device 125 to read payment instrument information and/or otherwise fulfill its role in payment processing for the transaction initiated by the merchant POS device 120. The message may include text, one or more images, one or more videos, audio, or some combination thereof. The message may include a logo of the merchant, for example. The message may include offers, promotions, coupons, or discounts that may be applied to items or services already being purchased by the customer. The message may include one or more advertisements, offers, promotions, coupons, or discounts for additional items or services to purchase from the merchant, for example for items or services that the customer has purchased in the past, for items or services that are complementary or related to items or services that the customer is currently purchasing or has purchased in the past, or for items or services that are often purchased by other customers along with items or services that the customer is currently purchasing or has purchased in the past. Complementary or related to items or services may include items or services from the same brand, same manufacturer, same distributor, same category (e.g., office supplies, clothing, consumables), that are useful alongside one another (e.g., pen and paper and pencil, printer and paper and ink cartridge, meal and side dish and beverage, sun hat and sunglasses and sunscreen and swimwear and beach towel, warm hat and coat and gloves).

At step 420, a processor of the payment reader terminal device 125 renders the message for display, then displays the message via a display screen of the payment reader terminal device 125, at least until receipt of the payment amount by the payment reader terminal device 125 at step 220. At step 425, the payment reader terminal device 125 optionally receives an input from the customer via a user interface of the payment reader terminal device 125 (e.g., a touch-sensitive interface of a touch screen, a button) while the message is displayed via the display screen of the payment reader terminal device 125. At step 430, in response to receipt of the input at step 425, the payment reader terminal device 125 sends a request to the checkout service 110 for a modification to the t transaction. The modification may depend on the content of the message. For example, if the message advertises an additional item or service, the modification may include adding the additional item or service for purchase as part of the transaction. If the message includes an offer, promotion, discount, or coupon applicable for a particular item or service, the modification may include reducing the price associated with the particular item or service, and as a result reducing the payment amount.

At step 435, the checkout service server(s) 130 receives the request for the modification to the transaction. At step 440, the checkout service server(s) 130 notifies the merchant POS device 120 regarding the request for the modification to the transaction, for example by sending the request for the modification to the transaction on to the merchant POS device 120, or by otherwise identifying the requested modification to the transaction to the merchant POS device 120. At step 445, the merchant POS device 120 receives the notification stent at step 440. At step 450, the merchant POS device 120 modifies the transaction as requested, for example by adding the additional item or service, or by reducing the price of an item or service, and modifies the payment amount as needed if applicable.

Step 455 is identical to step 205 from the operations 200 of FIG. 2, though the request of step 4555 has the updated payment amount associated with the transaction having the modification applied in step 450. Step 460 is identical to step 210 from the operations 200 of FIG. 2, though again with the new modified payment amount. Step 465 is identical to step 215 from the operations 200 of FIG. 2, though again with the new modified payment amount. Step 465 is identical to step 220 from the operations 200 of FIG. 2, though again with the new modified payment amount. Step 470 is identical to step 225 from the operations 200 of FIG. 2, though again with the new modified payment amount.

At step 475, in response to receipt of the payment amount at step 470, the payment reader terminal device 125 displays payment instructions via the display screen of the payment reader terminal device 125 until the payment instrument is received (e.g., into a slot of the payment reader terminal device 125) and/or read by one of the one or more payment instrument readers of the payment reader terminal device 125.

Figure 5:
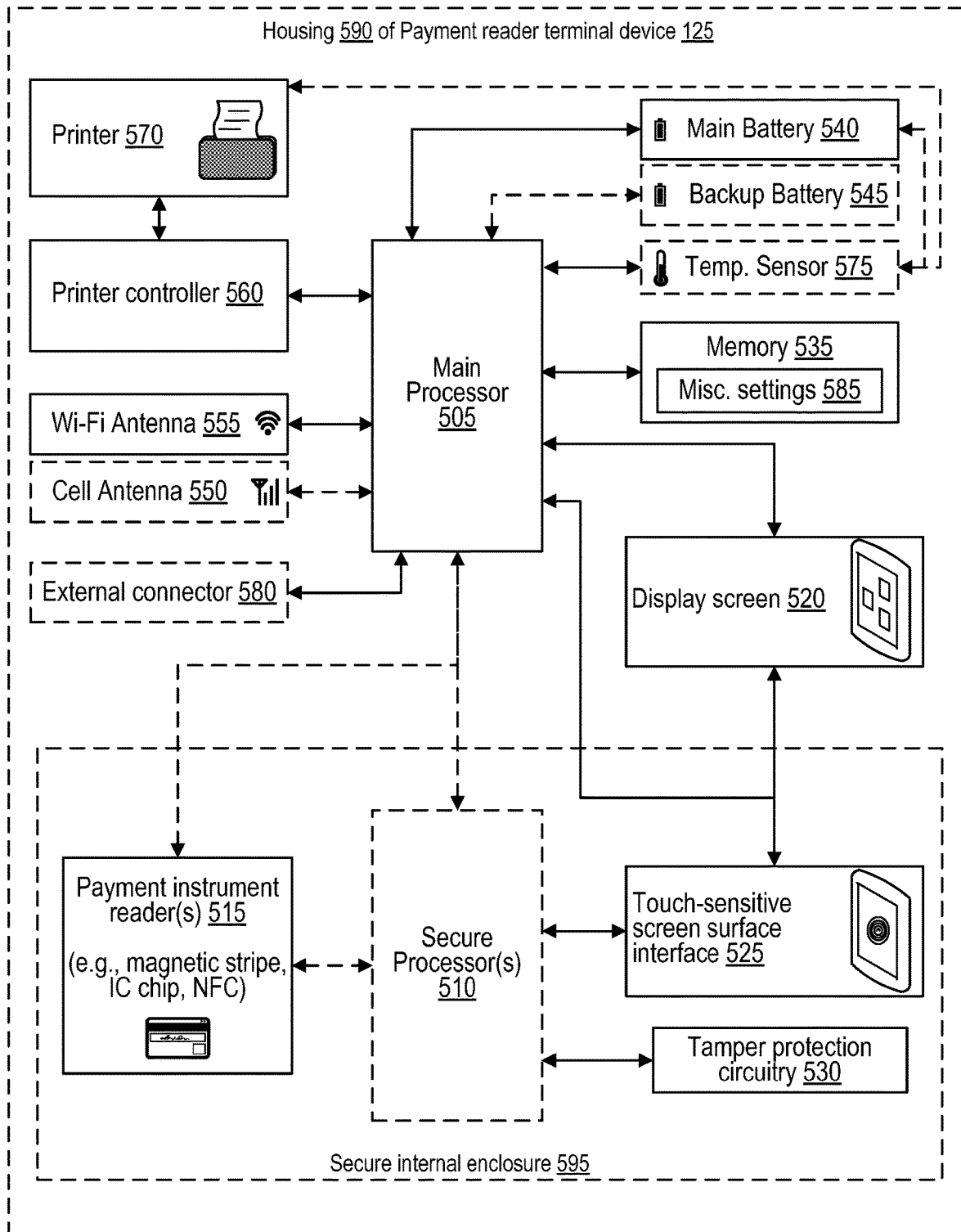
FIG. 5 is an architecture diagram of a payment reader terminal device.

FIG. 5 is an architecture diagram of a payment reader terminal device.

The architecture diagram of the payment reader terminal device 125 of FIG. 5 includes a main processor 505 in a housing 590, and optionally one or more secure processor(s) 510 within a secure internal enclosure 595 within the housing 590. The main processor 505 may execute instructions to perform a variety of tasks, which may include communicating with the one or more secure processor(s) 510 as well as communicating with and/or controlling the various components coupled directly or indirectly to the main processor 505.

The main processor 505 is coupled to a main battery 540 and optionally a backup battery 545 in FIG. 5. In some cases, the main battery 540 may be rechargeable, while the backup battery 545 may be non-rechargeable. Ultimately, however, either or both of the batteries may be rechargeable or non-rechargeable. The main processor 505, main battery 540, and/or backup battery 545 may also be connected to a power connector (not pictured) that can be connected to an external battery (not pictured), an external generator (not pictured), or a power outlet (not pictured). The power connector can be used to recharge the main battery 540 and/or backup battery 545. The power connector can also be used to directly power the processor 505 and all other components of the payment reader terminal device 125, even if both the main battery 540 and backup battery 545 are missing.

The main processor 505 is coupled to a printer 570 via a printer controller 560. The printer 570 may be used to print receipts, coupons, barcodes, quick-response ("QR") codes, or some combination thereof. The printer 570 may be a thermal printer, a direct thermal printer, a thermal transfer thermal printer, a solid-ink "phaser" printer, an inkjet printer, a thermal inkjet ("bubblejet") printer, a continuous inkjet printer, a piezoelectric inkjet printer, a dye-sublimation printer, a laser printer, an LED printer, or some combination thereof. The printer controller 560 may include a memory and/or a processor, microcontroller or ASIC (application specific integrated controller) with which it may adjust various printer setting values assigned to various printer settings to control various aspects of the how the printer 570 prints.

In some cases, the main processor 505 is coupled to a temperature sensor 575 in FIG. 5 used to ensure that the payment reader terminal device 125 stays within a temperature range in which it can operate safely and securely. The temperature sensor may optionally include one or more thermistors, and may optionally be connected to the main battery 540 and/or to the printer 570. The temperature sensor may include one or more of a Negative Temperature Coefficient (NTC) thermistor, a Resistance Temperature Detector (RTD), a resistance thermometer, a thermocouple, an infrared sensor, a bimetallic device, a thermometer, a change-of-state sensor, a semiconductor-based temperature sensor, a silicon diode or other diode with temperature-sensitive voltage characteristics, or some combination thereof.

The main processor 505 may be connected to one or more antennas, including an 802.11 Wi-Fi antenna 555, a cellular phone network antenna 550, a Bluetooth® antenna, a Bluetooth® Low Energy (BLE) antenna, any other antennae or communication means discussed with respect to the output devices 750 or input devices 760 of FIG. 7, or some combination thereof. The main processor 505 may alternately be connected to other means to networking, such as a wired Ethernet port.

The main processor 505 may be any type of processor 710 identified with respect to FIG. 7, and may be in some cases be part of, or include, an application-specific integrated circuit (ASIC). While the main processor 505 and secure processor(s) 510 are illustrated as separate components in FIG. 5, the main processor 505 and secure processor(s) 510 may in some cases be combined into a single component. It should be understood that any actions described herein as being performed by the secure processor(s) 510 can alternately or additionally be performed by the main processor 505, and that that any actions described herein as being performed by the main processor 505 can alternately or additionally be performed by the secure processor(s) 510.

The secure internal enclosure 595 can include tamper protection circuitry 530, such as tamper traces or grids running along one or more surfaces of the secure internal enclosure, allowing the secure processor(s) 510 to detect attempts to tamper with the secure internal enclosure 595 or any components within. For example, tamper protection circuitry 530 can detect attempts to open the secure internal enclosure 595, to drill into the secure internal enclosure 595, to modify the secure internal enclosure 595, or to flood the secure internal enclosure 595 with a conductive fluid, such as a conductive ink. The tamper protection circuitry 530 can do this by measuring voltages at one or more points along a circuit connected to the tamper traces or grids running along the surface(s) of the secure internal enclosure 595, allowing the tamper protection circuitry 530 to detect short circuits, breaks in the circuit, or other changes in voltage outside of ordinary threshold levels, which would typically indicate a tampering attempt. Detection of a tamper attempt could be used by the secure processor(s) 510 or main processor 505 to disable at least a subset of the functions or components of the payment reader terminal device 125. In some cases, one or more conductive tamper traces run along an interior surface of the secure internal enclosure 595, and the tamper protection circuitry 530 is configured to detect a change in voltage along the one or more conductive tamper traces, for example caused by a break in a conductive tamper trace caused by a tamper attempt, or caused by a first conductive tamper trace that is normally (i.e., when not tampered with) at a first voltage being connected during a tamper attempt to a second conductive tamper trace that is normally (i.e., when not tampered with) at a second voltage.

The secure internal enclosure 595 and its included tamper protection circuitry 530 can be used to protect any circuitry that reads, stores, or otherwise conveys sensitive information, such as credit or debit card numbers, near field communication (NFC) signal data from a NFC object conveying transaction information, bank account information, other payment instrument information, bank account information, credit account information, customer identifiers, merchant identifiers, payment reader terminal device identifiers, other transaction information, customer biometric information, customer contact information, customer identity information, customer photographs or facial scans, Personal Identification Number (PIN) numbers or codes, handwritten signature scans, handwritten signatures entered via a touch-sensitive surface of the payment reader terminal device 125, digital certificate signatures, symmetric encryption keys, asymmetric encryption keys, other types of encryption keys, and so forth.

Because information entered via a touch-sensitive screen surface interface 525 of a touchscreen 210 may include sensitive information, such as PIN codes or handwritten signatures entered via touch-sensitive surface, circuitry reading inputs of the touch-sensitive surface may in some cases be housed in the secure internal enclosure 595, while the circuitry of the display screen 520 of the touchscreen 210 might not be. Likewise, the payment reader terminal device 125 may include other input devices 760 as discussed with respect to FIG. 7, such as physical keypads, whose circuitry might also be located in the secure internal enclosure 595 for the same reasons. The touch-sensitive screen surface interface 525 may use any type of display discussed in reference to the display system 770 of FIG. 7, and may use capacitive touch sensing, resistive touch sensing, inductive touch sensing, or some combination thereof. For example, the touch-sensitive screen surface interface 525 may utilize a Indium Tin Oxide (ITO) touch-sensitive layer or a printed ink touch-sensitive layer.

The secure processor(s) 510 are also connected to one or more payment instrument reader(s) 515. The payment instrument reader(s) 515 may include a magnetic stripe reader 235, an integrated circuit (IC) chip reader 225, a near field communication (NFC) reader, or some combination thereof. The magnetic stripe reader 235 reads payment instrument data from a magnetic stripe of a payment instrument such as a payment card. The IC chip reader 225 reads payment instrument data from an IC chip of a payment instrument such as a payment card. The IC chip may be a chip following Europay/Mastercard/Visa ("EMV") standards, also known as an EMV chip. The NFC reader reads payment instrument data from wireless NFC signals received from a payment instrument such as a payment card or payment device. The payment instrument may be a payment card, such as a credit card or a debit card. The payment instrument may be any type of NFC-capable device, such as an active NFC tag, a passive NFC tag, or a computer system 500 as described with respect to FIG. 5. In some cases, multiple payment instrument readers 515 may share components—for example, the IC chip reader 225 and the NFC reader may share a contactless antenna. Once the payment instrument reader(s) 515 retrieve the payment instrument data from the payment instrument, the payment instrument reader(s) 515 send the payment instrument data to the secure processor(s) 510 and/or main processor 505. The payment instrument reader(s) 515 or secure processor(s) 510 sometimes modify or encrypt the payment instrument data using an encryption key stored in a memory (not pictured) associated with the payment instrument reader(s) 515 and/or secure processor(s) 510 before sending it to the main processor 505.

The main processor 505 may also be connected to a memory 535 that stores various instructions to be executed by the main processor, such as instructions corresponding to a financial transaction software application allowing the main processor 505 to receive transaction data read by the payment instrument reader(s) 515, optionally via the secure processor(s) 510, and to transmit that data to one or more financial transaction processing server(s), such as credit or debit card processing server(s) and/or bank server(s), thereby conducting a financial transaction between a merchant and a buyer whose transaction information was read via the payment instrument reader(s) 515. The memory 535 may also store settings associated with the printer controller 560, the display screen 520, the touch-sensitive screen surface interface 525, the Wi-Fi antenna 555, the cellular antenna 550, the NFC transceiver, and various other components of the payment reader terminal device 125.

The main processor 505 may also be connected to at least one external connector 580, which may be an externally-facing female port or male plug that may allow the POS device 510 to connect to other devices or power sources. In some cases, the external connector 580 may allow the payment reader terminal device 125 to connect to any other computing device 700, or to any device including at least a subset of the components identified in FIG. 8 or discussed in its description. The payment reader terminal device 125 may be connected to one or more peripheral devices or hubs via the at least one external connector 580. The payment reader terminal device 125 may in some cases act as a peripheral device to a host device connected via the at least one external connector 580. In some cases, the external connector 580 may function as the power connector discussed above with respect to the batteries 540/145 and/or external power sources. In some cases, the external connector 580 may be a universal serial bus (USB) port/plug using any USB standard, including USB Type-A, USB Type-B, USB Type-C, USB 5.x, USB 2.x, USB 3.x, USB 4.x, Thunderbolt, USB mini, USB micro, USB On-The-Go (OTG), any other USB standard, or some combination thereof. In other cases, the external connector 580 may be an Apple® Lightning® port/plug, an Ethernet port/plug, a fiber optic port/plug, a proprietary wired port/plug. In other cases, the external connector 580 may be a wireless transceiver, such as one supporting a BLUETOOTH® wireless signal transfer, a BLUETOOTH® low energy (BLE) wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof.

The payment reader terminal device 125 may also include various additional or alternative elements connected to the main processor 505 and/or the secure processor(s) 510, each of which may optionally be located in the secure internal enclosure 595. Such additional or alternative elements may include microphones. The additional or alternative elements may include cameras, such as visible light cameras, infrared cameras, ultraviolet cameras, night vision cameras, or even ambient light sensors. Ambient light sensors may optionally be coupled to the main processor 505 and/or the display screen 520 to control brightness of the display screen 520 and/or of a backlight of the display screen 520 in order to acclimatize to the ambient light level around the payment reader terminal device 125 and prevent the display screen 520 from appearing too bright/harsh or too dim/unclear. The additional or alternative elements may include biometric sensors, such as fingerprint scanners, handprint scanners, voice authentication, facial recognition or iris scanners (using any of the camera types discussed above), blood testers, DNA testers, or some combination thereof. The processor(s) 505/110 may compare received biometric data from the buyer via the biometric sensors against databases stored within the memory 535 or accessible to the payment reader terminal device 125 via a network connection via the Internet or a private network. The additional or alternative elements may include one or more accelerometer(s) and/or one or more gyroscope(s), allowing the processor(s) 505/110 of the payment reader terminal device 125 to react to being tilted, moved, or shaken, optionally as indications of tampering via the tamper protection circuitry 530 if the payment reader terminal device 125 is intended to be stationary. The additional or alternative elements may include one or more indicator lights, which may be light-emitting diodes (LED) and may emit light, optionally at varying brightnesses and/or colors, to indicate a successful transaction, to indicate a failed transaction, to indicate that a card or other payment instrument should be presented/inserted/swiped, to indicate that a card or other payment instrument should be removed, to indicate that a user input such as a PIN code must be input via the touch-sensitive display screen 210, to indicate that an input via the touch-sensitive display screen 210 has been received, to indicate successful connection via any of the antennae of the POS system 500, to indicate failure to connect via any of the antennae of the POS system 500, to indicate a signal strength associated with any of the antennae of the POS system 500, or some combination thereof. The additional or alternative elements may include any components illustrated in or discussed with respect to FIG. 7.

It should be noted that the components of the payment reader terminal device 125 of FIG. 5 are just exemplary. In some cases, any subset of these may be missing from the payment reader terminal device 125. For example, a payment reader terminal device 125 may be a "headless" device that has no display screen 520 or touch-sensitive surface interface 525, and may instead include one or more light emitting diodes (LEDs) as indicators of when to insert a payment card or approach with a NFC-enabled payment instrument and/or one or more speakers and/or one or more physical buttons, or may include none of these things. The payment reader terminal device 125 may have any number of payment instrument readers 515—it may have one or more magnetic stripe readers, one or more IC chip readers, one or more NFC readers, or any combination thereof.

Figure 6:
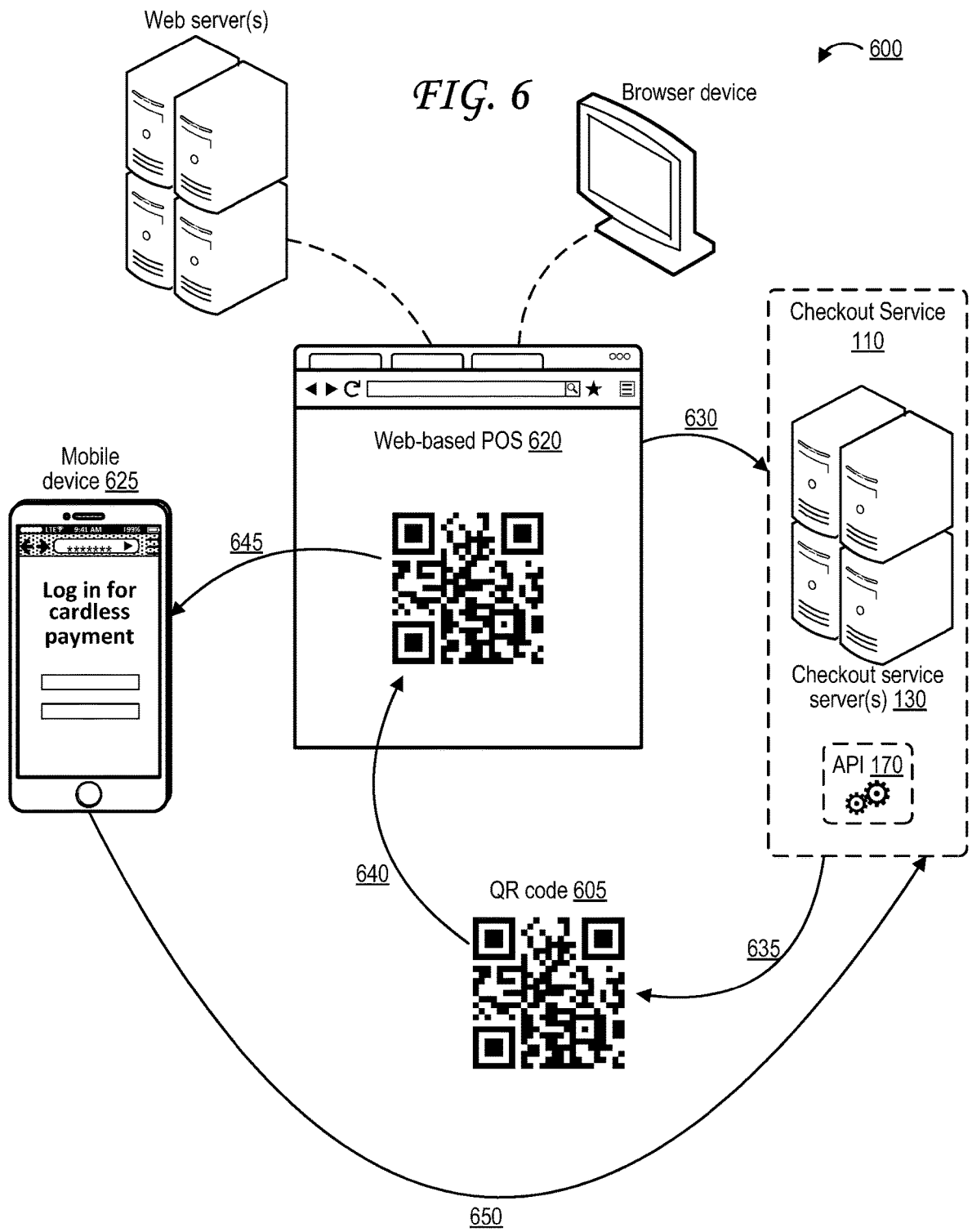
FIG. 6 illustrates a system architecture including a web-based point of sale (POS) device and mobile device that collaborate to perform a cardless transaction.

FIG. 6 illustrates a system architecture including a web-based point of sale (POS) device and mobile device that collaborate to perform a cardless transaction. The system architecture 600 of FIG. 6 includes, for example, the checkout service 110, a web-based POS system 620, and a mobile device 625.

In some cases, the merchant POS device 120 may be a web-based POS system 620 hosted on a website rather than a device physically located at the merchant location 105. In this case, the merchant POS device 120 as discussed otherwise herein may be a web server that serves the website, a browser device that browses the website, or some combination thereof. That is, the web server or the browser device may fulfill the role of the merchant POS device 120 in the contexts discussed herein, for example in the context of the architecture 100, the operations 200, the operations 300, the operations 400, or some combination thereof.

In this case, the web-based POS 620 may receive an input from the merchant or customer interacting with the website to select one or more purchases of items and/or services by the customer from the merchant. The web-based POS 620—that is, the web server or the browser device—may sent a request (signified by arrow 630) to the checkout service 110 to process the payment amount of the transaction, which may be received by the checkout service 110, much like steps 205 and 210 of the operations 200 of FIG. 2.

The checkout service 110 may, as signified by arrow 635, output a quick response (QR) code 605 in response to receipt of the request at arrow 630. As signified by arrow 640, the QR code 605 may be sent to the web server and/or browser device so that it appears in the web-based POS 620 and is displayed by the device browsing the web-based POS 620, for example via an iFrame in the web-based POS 620 or PHP insert into web-based POS 620. A customer can use his or her mobile device 625 to scan the QR code 605 with a camera of the mobile device 625 as signified by the arrow 645. The QR code 605, as generated by the checkout service 110, may lead to a webpage associated with the checkout service 110 through which the customer may perform a cardless checkout, for example by entering payment instrument information such as credit or debit card numbers, by entering a login associated with the checkout service to access previously-entered or previously-read payment instrument information. The customer can then approve of the payment and directly notify the checkout service (as signified by arrow 650) to proceed with transfer of funds from an account associated with the customer to an account associated with the merchant. The checkout service 110 may then perform the transfer or request that one or more financial entity server(s) 135 perform the transfer as in steps 245, 250, and 252 of the operations 200 of FIG. 2. Like steps 255, 260, 265, and 270 of the operations 200 of FIG. 2, the checkout service 110 may receive and send confirmations that the transfer has completed successfully and that the transaction has been processed successfully.

The QR code 605 may alternately be a bar code or a text link that may be entered into the mobile device 625 manually.

FIG. 7 illustrates an exemplary computing system 700 that may be used to implement some aspects of the technology. For example, any of the computing devices, computing systems, network devices, network systems, servers, and/or arrangements of circuitry described herein may include at least one computing system 700, or may include at least one component of the computer system 700 identified in FIG. 7. The computing system 700 of FIG. 7 includes one or more processors 710 and memory 720. Each of the processor(s) 710 may refer to one or more processors, controllers, microcontrollers, central processing units (CPUs), graphics processing units (GPUs), arithmetic logic units (ALUs), accelerated processing units (APUs), digital signal processors (DSPs), application specific integrated circuits (ASICs), field-programmable gate arrays (FPGAs), or combinations thereof. Each of the processor(s) 710 may include one or more cores, either integrated onto a single chip or spread across multiple chips connected or coupled together. Memory 720 stores, in part, instructions and data for execution by processor 710. Memory 720 can store the executable code when in operation. The system 700 of FIG. 7 further includes a mass storage device 730, portable storage medium drive(s) 740, output devices 750, user input devices 760, a graphics display 770, and peripheral devices 780.

The components shown in FIG. 7 are depicted as being connected via a single bus 790. However, the components may be connected through one or more data transport means. For example, processor unit 710 and memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing some aspects of the subject technology for purposes of loading that software into memory 720.

Portable storage device 740 operates in conjunction with a portable non-volatile storage medium, such as a floppy disk, compact disk or Digital video disc, to input and output data and code to and from the computer system 700 of FIG. 7. The system software for implementing aspects of the subject technology may be stored on such a portable medium and input to the computer system 700 via the portable storage device 740.

The memory 720, mass storage device 730, or portable storage 740 may in some cases store sensitive information, such as transaction information, health information, or cryptographic keys, and may in some cases encrypt or decrypt such information with the aid of the processor 710. The memory 720, mass storage device 730, or portable storage 740 may in some cases store, at least in part, instructions, executable code, or other data for execution or processing by the processor 710.

Output devices 750 may include, for example, communication circuitry for outputting data through wired or wireless means, display circuitry for displaying data via a display screen, audio circuitry for outputting audio via headphones or a speaker, printer circuitry for printing data via a printer, or some combination thereof. The display screen may be any type of display discussed with respect to the display system 770. The printer may be inkjet, laserjet, thermal, or some combination thereof. In some cases, the output device circuitry 750 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. Output devices 750 may include any ports, plugs, antennae, wired or wireless transmitters, wired or wireless transceivers, or any other components necessary for or usable to implement the communication types listed above, such as cellular Subscriber Identity Module (SIM) cards.

Input devices 760 may include circuitry providing a portion of a user interface. Input devices 760 may include an alpha-numeric keypad, such as a keyboard, for inputting alpha-numeric and other information, or a pointing device, such as a mouse, a trackball, stylus, or cursor direction keys. Input devices 760 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a wired local area network (LAN) port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, personal area network (PAN) signal transfer, wide area network (WAN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. Input devices 760 may include any ports, plugs, antennae, wired or wireless receivers, wired or wireless transceivers, or any other components necessary for or usable to implement the communication types listed above, such as cellular SIM cards.

Input devices 760 may include receivers or transceivers used for positioning of the computing system 700 as well. These may include any of the wired or wireless signal receivers or transceivers. For example, a location of the computing system 700 can be determined based on signal strength of signals as received at the computing system 700 from three cellular network towers, a process known as cellular triangulation. Fewer than three cellular network towers can also be used—even one can be used—though the location determined from such data will be less precise (e.g., somewhere within a particular circle for one tower, somewhere along a line or within a relatively small area for two towers) than via triangulation. More than three cellular network towers can also be used, further enhancing the location's accuracy. Similar positioning operations can be performed using proximity beacons, which might use short-range wireless signals such as BLUETOOTH® wireless signals, BLUETOOTH® low energy (BLE) wireless signals, IBEACON® wireless signals, personal area network (PAN) signals, microwave signals, radio wave signals, or other signals discussed above. Similar positioning operations can be performed using wired local area networks (LAN) or wireless local area networks (WLAN) where locations are known of one or more network devices in communication with the computing system 700 such as a router, modem, switch, hub, bridge, gateway, or repeater. These may also include Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. Input devices 760 may include receivers or transceivers corresponding to one or more of these GNSS systems.

Display system 770 may include a liquid crystal display (LCD), a plasma display, an organic light-emitting diode (OLED) display, an electronic ink or "e-paper" display, a projector-based display, a holographic display, or another suitable display device. Display system 770 receives textual and graphical information, and processes the information for output to the display device. The display system 770 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 780 may include any type of computer support device to add additional functionality to the computer system. For example, peripheral device(s) 780 may include one or more additional output devices of any of the types discussed with respect to output device 750, one or more additional input devices of any of the types discussed with respect to input device 760, one or more additional display systems of any of the types discussed with respect to display system 770, one or more memories or mass storage devices or portable storage devices of any of the types discussed with respect to memory 720 or mass storage 730 or portable storage 740, a modem, a router, an antenna, a wired or wireless transceiver, a printer, a bar code scanner, a quick-response ("QR") code scanner, a magnetic stripe card reader, a integrated circuit chip (ICC) card reader such as a smartcard reader or a EUROPAY®-MASTERCARD®-VISA® (EMV) chip card reader, a near field communication (NFC) reader, a document/image scanner, a visible light camera, a thermal/infrared camera, an ultraviolet-sensitive camera, a night vision camera, a light sensor, a phototransistor, a photoresistor, a thermometer, a thermistor, a battery, a power source, a proximity sensor, a laser rangefinder, a sonar transceiver, a radar transceiver, a lidar transceiver, a network device, a motor, an actuator, a pump, a conveyer belt, a robotic arm, a rotor, a drill, a chemical assay device, or some combination thereof.

The components contained in the computer system 700 of FIG. 7 can include those typically found in computer systems that may be suitable for use with some aspects of the subject technology and represent a broad category of such computer components that are well known in the art. That said, the computer system 700 of FIG. 7 can be customized and specialized for the purposes discussed herein and to carry out the various operations discussed herein, with specialized hardware components, specialized arrangements of hardware components, and/or specialized software. Thus, the computer system 700 of FIG. 7 can be a personal computer, a hand held computing device, a telephone ("smartphone" or otherwise), a mobile computing device, a workstation, a server (on a server rack or otherwise), a minicomputer, a mainframe computer, a tablet computing device, a wearable device (such as a watch, a ring, a pair of glasses, or another type of jewelry or clothing or accessory), a video game console (portable or otherwise), an e-book reader, a media player device (portable or otherwise), a vehicle-based computer, another type of computing device, or some combination thereof. The computer system 700 may in some cases be a virtual computer system executed by another computer system. The computer can also include different bus configurations, networked platforms, multi-processor platforms, etc. Various operating systems can be used including Unix®, Linux®, FreeBSD®, FreeNAS®, pfSense®, Windows®, Apple® Macintosh OS® ("MacOS®"), Palm OS®, Google® Android®, Google® Chrome OS®, Chromium® OS®, OPENSTEP®, XNU®, Darwin®, Apple® iOS®, Apple® tvOS®, Apple® watchOS®, Apple® audioOS®, Amazon® Fire OS®, Amazon® Kindle OS®, variants of any of these, other suitable operating systems, or combinations thereof. The computer system 700 may also use a Basic Input/Output System (BIOS) or Unified Extensible Firmware Interface (UEFI) as a layer upon which the operating system(s) are run.

In some cases, the computer system 700 may be part of a multi-computer system that uses multiple computer systems 700, each for one or more specific tasks or purposes. For example, the multi-computer system may include multiple computer systems 700 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 700 from different networks communicatively coupled together via the internet (also known as a "distributed" system).

Some aspects of the subject technology may be implemented in an application that may be operable using a variety of devices. Non-transitory computer-readable storage media refer to any medium or media that participate in providing instructions to a central processing unit (CPU) for execution and that may be used in the memory 720, the mass storage 730, the portable storage 740, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L7), resistive random-access memory (RRAM/ReRAM), phase change memory (PCM), spin transfer torque RAM (STT-RAM), another memory chip or cartridge, or a combination thereof.

Various forms of transmission media may be involved in carrying one or more sequences of one or more instructions to a processor 710 for execution. A bus 790 carries the data to system RAM or another memory 720, from which a processor 710 retrieves and executes the instructions. The instructions received by system RAM or another memory 720 can optionally be stored on a fixed disk (mass storage device 730/portable storage 740) either before or after execution by processor 710. Various forms of storage may likewise be implemented as well as the necessary network interfaces and network topologies to implement the same.

While various flow diagrams provided and described above may show a particular order of operations performed by some embodiments of the subject technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a machine, mechanism, and/or computing system 700 discussed herein, and may be performed automatically (e.g., in response to one or more triggers/conditions described herein), autonomously, semi-autonomously (e.g., based on received instructions), or a combination thereof. Furthermore, any action described herein as occurring in response to one or more particular triggers/conditions should be understood to optionally occur automatically response to the one or more particular triggers/conditions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The invention claimed is:

1. A method of facilitating transaction processing, the method comprising:
   receiving a request to process a payment amount for a transaction between a customer and a merchant at a checkout service having one or more servers and from a merchant device of the merchant, the payment amount corresponding to one or more purchases by the customer from the merchant, the request formatted for an application programming interface (API) of the checkout service;
   identifying, at the checkout service, a terminal device of the merchant that is authorized to cooperate with the merchant device of the merchant at least in part by querying a database for a pairing record that identifies both a merchant device identifier of the merchant device of the merchant and a terminal device identifier of the terminal device of the merchant, wherein the terminal device of the merchant is distinct from the merchant device of the merchant, wherein the one or more servers of the checkout service are communicatively coupled to the merchant device and the terminal device over one or more networks;
   transmitting the payment amount from the checkout service to the terminal device;
   receiving the payment amount at the terminal device of the merchant from the checkout service;
   reading payment card information from a payment card at the terminal device of the merchant;
   formatting the payment card information for the API of the checkout service;
   transmitting the payment card information from the terminal device of the merchant to the checkout service in response to formatting the payment card information for the API of the checkout service;
   receiving the payment card information at the checkout service from the terminal device of the merchant, the payment card information formatted for the API of the checkout service;
   triggering processing of a transfer of a total payment amount of funds that is based on the payment amount from an account of the customer to an account of the merchant by transmitting, from the checkout service to a payment processing system, at least the payment card information and at least one of the payment amount and the total payment amount of funds; and
   sending a confirmation from the checkout service to the merchant device of the merchant, the confirmation indicating that the transaction has been processed.

2. The method of claim 1, wherein reading payment card information from a payment card at the terminal device of the merchant includes reading the payment card information from one of a magnetic stripe of the payment card or an integrated circuit chip of the payment card.

3. The method of claim 1, wherein reading payment card information from a payment card at the terminal device of the merchant includes receiving the payment card information from the payment card wirelessly via near field communication (NFC).

4. The method of claim 1, further comprising displaying the payment amount via a display screen of the terminal device of the merchant in response to receiving the payment amount at the terminal device of the merchant.

5. The method of claim 1, wherein the request also identifies one or more secondary payment amounts to process for the transaction, further comprising:
   transmitting the one or more secondary payment amounts from the checkout service to the terminal device of the merchant;
   receiving the one or more secondary payment amounts at the terminal device of the merchant from the checkout service; and
   calculating the total payment amount at the terminal device of the merchant by calculating a sum of the payment amount and the one or more secondary payment amounts, wherein triggering processing of the transfer of the total payment amount includes triggering processing of the transfer of the total payment amount by transmitting the total payment amount from the checkout service to a payment processing system.

6. The method of claim 1, further comprising:
   receiving a message at the checkout service;
   transmitting the message from the checkout service to the terminal device of the merchant before transmitting the payment amount from the checkout service to the terminal device of the merchant;
   receiving the message at the terminal device of the merchant from the checkout service;
   in response to receipt of the message at the terminal device of the merchant, displaying the message via a display screen of the terminal device of the merchant until receipt of the payment amount at the terminal device of the merchant; and
   in response to receipt of the payment amount at the terminal device of the merchant, displaying customer payment instructions via the display screen of the terminal device of the merchant.

7. The method of claim 6, further comprising:
   receiving an input via a user interface of the terminal device of the merchant while the message is displayed via the display screen of the terminal device of the merchant;

sending a request for a modification to the transaction from the terminal device of the merchant to the checkout service in response to receipt of the input via the user interface of the terminal device of the merchant;

receiving the request for the modification to the transaction at the checkout service; and notifying the merchant device of the merchant from the checkout service regarding the request for the modification to the transaction, wherein the modification to the transaction affects the payment amount.

8. The method of claim 1, further comprising:

generating a receipt for the transaction at the checkout service, the receipt identifying at least one of the payment amount and the total payment amount;

transmitting the receipt from the checkout service to the terminal device of the merchant;

receiving the receipt at the terminal device of the merchant; and printing the receipt using a printer of the terminal device of the merchant automatically in response to receiving the receipt at the terminal device of the merchant.

9. A method of point of sale operation, the method comprising:

receiving a request to process a payment amount for a transaction between a customer and a merchant at a checkout service having one or more servers and from a merchant device of the merchant, the payment amount corresponding to one or more purchases by the customer from the merchant, the request formatted for an application programming interface (API) of the checkout service;

identifying, at the checkout service, a terminal device of the merchant that is authorized to cooperate with the merchant device of the merchant at least in part by querying a database for a pairing record that identifies both a merchant device identifier of the merchant device of the merchant and a terminal device identifier of the terminal device of the merchant, wherein the terminal device of the merchant is distinct from the merchant device of the merchant, wherein the one or more servers of the checkout service are communicatively coupled to the merchant device and the terminal device over one or more networks;

transmitting the payment amount from the checkout service to the terminal device of the merchant;

receiving payment object information at the checkout service from the terminal device of the merchant formatted for the API of the checkout service;

triggering processing of a transfer of a total payment amount of funds that is based on the payment amount from an account of the customer to an account of the merchant by transmitting, from the checkout service to a payment processing system, at least the payment object information and at least one of the payment amount and the total payment amount; and sending a confirmation from the checkout service to the merchant device of the merchant, the confirmation indicating that the transaction has been processed.

10. The method of claim 9, further comprising:

generating the pairing record that identifies both the merchant device identifier and the terminal device identifier; and storing the pairing record in the database.

11. The method of claim 9, further comprising:

receiving an update from the merchant device of the merchant at the checkout service after receiving the request to process the payment amount for the transaction, wherein the update identifies a modification to the payment amount; and notifying the terminal device of the merchant from the checkout service regarding the modification to the payment amount, wherein triggering processing of the transfer of the total payment amount includes triggering processing of the transfer of the payment amount as modified according to the modification.

12. The method of claim 9, further comprising:

storing the payment object information and additional payment object information at the checkout service, the additional payment object information corresponding to one or more additional transactions between the merchant and one or more other customers;

generating anonymized payment object information at the checkout service based on the payment object information and the additional payment object information by removing information indicative of customer identity from the payment object information and the additional payment object information;

generating transaction analytics at the checkout service using the anonymized payment object information and anonymized additional payment object information; and sending the transaction analytics to the merchant device of the merchant.

13. The method of claim 9, wherein the merchant device of the merchant is a web server device associated with a website, and wherein the request to process the payment amount for the transaction is based on identification of the one or more purchases by a browser device other than the web server device while the browser device is browsing the website.

14. The method of claim 9, wherein the merchant device of the merchant is a browser device that browses a website, and wherein the request to process the payment amount for the transaction is based on identification of the one or more purchases via one or more inputs received at the browser device while the browser device is browsing the website.

15. The method of claim 9, wherein the payment amount associated with the request is a sum of a plurality of partial payment amounts, each of the plurality of partial payment amounts corresponding to a different purchase of the one or more purchases.

16. A system for point of sale operation, the system comprising:

a communication interface that is communicatively coupled to a merchant device and a terminal device over one or more networks;

a memory storing instructions; and a processor that executes the instructions, wherein execution of the instructions by the processor causes the processor to:

receive a request to process a payment amount for a transaction between a customer and a merchant via the communication interface from a merchant device of the merchant, the payment amount corresponding to one or more purchases by the customer from the merchant, identify a terminal device of the merchant that is authorized to cooperate with the merchant device of the merchant at least in part by querying a database for a pairing record that identifies both a merchant device identifier of the merchant device of the merchant and a terminal device identifier of the terminal device of the merchant, wherein the terminal device of the merchant is distinct from the merchant device of the merchant, transmit the payment amount to the terminal device of the merchant via the communication interface, receive payment card information via the communication interface from the terminal device of the merchant, trigger processing of a transfer of a total payment amount of funds that is based on the payment amount from an account of the customer to an account of the merchant by transmitting, to a payment processing system via the communication interface, at least the payment card information and at least one of the payment amount and the total payment amount of funds, and send a confirmation to the merchant device of the merchant via the communication interface, the confirmation indicating that the transaction has been processed.

17. The system of claim 16, further comprising the terminal device of the merchant, wherein the terminal device of the merchant:

receives the payment amount from the communication interface, reads the payment card information from a payment card, and transmits the payment card information to the communication interface.

18. The system of claim 17, wherein the request is formatted for a server application programming interface (API), and wherein the payment card information is formatted for the server API.

19. The method of claim 1, wherein the terminal device of the merchant and the merchant device of the merchant are unconnected through any direct wired connection.

20. The method of claim 1, wherein the terminal device of the merchant and the merchant device of the merchant are unconnected through any direct wireless connection.

21. The method of claim 9, further comprising:

receiving the merchant device identifier from the merchant device of the merchant at the checkout service; and receiving the terminal device identifier from the terminal device of the merchant at the checkout service.

22. The method of claim 9, further comprising sending a second confirmation from the checkout service to the terminal device of the merchant, the second confirmation indicating that the transaction has been processed.

* * * * *